US010647168B1

(12) United States Patent
Nakatani et al.

(10) Patent No.: US 10,647,168 B1
(45) Date of Patent: May 12, 2020

(54) PNEUMATIC TIRE

(71) Applicant: SUMITOMO RUBBER INDUSTRIES, LTD., Kobe-shi, Hyogo (JP)

(72) Inventors: Masako Nakatani, Kobe (JP); Takahiro Kawachi, Kobe (JP); Nanaho Kami, Kobe (JP); Ayuko Yamada, Kobe (JP); Takuya Horiguchi, Kobe (JP); Tatsuhiro Tanaka, Kobe (JP); Keiji Takagi, Kobe (JP); Subaru Toya, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 148 days.

(21) Appl. No.: 16/080,210

(22) PCT Filed: Dec. 6, 2017

(86) PCT No.: PCT/JP2017/043851
§ 371 (c)(1),
(2) Date: Aug. 27, 2018

(87) PCT Pub. No.: WO2018/123484
PCT Pub. Date: Jul. 5, 2018

(30) Foreign Application Priority Data

Dec. 28, 2016 (JP) ................................. 2016-256342

(51) Int. Cl.
*B60C 19/00* (2006.01)
*B60C 1/00* (2006.01)
(Continued)

(52) U.S. Cl.
CPC .......... *B60C 19/002* (2013.01); *B60C 1/0016* (2013.01); *B60C 5/002* (2013.01);
(Continued)

(58) Field of Classification Search
CPC ..... B60C 19/00; B60C 19/002; B60C 19/003; B60C 19/12; B60C 19/122; B60C 5/00; B60C 5/002
See application file for complete search history.

(56) References Cited

U.S. PATENT DOCUMENTS

| 8,448,743 B2 * | 5/2013 | Tanno | ................... B60C 19/002 152/157 |
|---|---|---|---|
| 2007/0131327 A1 | 6/2007 | Yukawa et al. | |

(Continued)

FOREIGN PATENT DOCUMENTS

| EP | 1 795 377 A2 | 6/2007 |
|---|---|---|
| JP | 2007-76548 A | 3/2007 |

(Continued)

OTHER PUBLICATIONS

International Search Report (PCT/ISA/210) issued in PCT/JP2017/043851, dated Mar. 6, 2018.

(Continued)

*Primary Examiner* — Justin R Fischer
(74) *Attorney, Agent, or Firm* — Birch, Stewart, Kolasch & Birch, LLP

(57) ABSTRACT

To be capable of preventing deterioration of uniformity after puncture repair while suppressing running noise.
[Solution] A pneumatic tire 1 comprises a noise damper 20 fixed to a tire inner cavity surface of a tread portion 2 and formed of a porous material. The noise damper 20 includes a first part 23 arranged on an outer side in a tire radial direction and fixed to the tire inner cavity surface 16, and a second part 24 arranged on an inner side in the tire radial direction of the first part 23 and exposed in a tire inner cavity 17. A water absorption rate of the first part 23 calculated by a following formula (1) is in a range of from 5% to 25%. Air permeability of the second part 24 measured in accordance (Continued)

with Japanese Industrial Standard JIS-L1096 is in a range of from 1 to 7 cm3/cm2/s. The formula (1) is:

water absorption rate (%)=weight change before and after immersion (g)/volume at 50% compression (cm3)×100    (1).

19 Claims, 4 Drawing Sheets

(51) Int. Cl.
- *B60C 9/18* (2006.01)
- *C08K 3/04* (2006.01)
- *C08K 3/06* (2006.01)
- *C08K 3/36* (2006.01)
- *B60C 11/00* (2006.01)
- *B60C 5/00* (2006.01)

(52) U.S. Cl.
CPC ............ *B60C 9/18* (2013.01); *B60C 11/0008* (2013.01); *C08K 3/04* (2013.01); *C08K 3/06* (2013.01); *C08K 3/36* (2013.01); *B60C 2011/0025* (2013.01)

(56) References Cited

U.S. PATENT DOCUMENTS

| | | |
|---|---|---|
| 2009/0277553 A1 | 11/2009 | Tanno et al. |
| 2010/0038005 A1 | 2/2010 | Aoki et al. |
| 2013/0160914 A1 | 6/2013 | Oba |
| 2016/0339749 A1 | 11/2016 | Yukawa |

FOREIGN PATENT DOCUMENTS

| | | |
|---|---|---|
| JP | 2007-161029 A | 6/2007 |
| JP | 2009-292461 A | 12/2009 |
| JP | 2012-025816 A | 2/2012 |
| JP | 2016-060229 A | 4/2016 |
| JP | 2016-210250 A | 12/2016 |
| WO | WO 2008/062673 A1 | 5/2008 |
| WO | WO 2012/050000 A1 | 4/2012 |
| WO | WO 2015/118707 A1 | 8/2015 |

OTHER PUBLICATIONS

Written Opinion (PCT/ISA/237) issued in PCT/JP2017/043851, dated Mar. 6, 2018.
Extended European Search Report dated Oct. 24, 2019, for European Patent Application No. 17889124.8.

\* cited by examiner

PNEUMATIC TIRE

TECHNICAL FIELD

The present invention relates to a pneumatic tire in which a noise damper is disposed on a tire inner cavity surface.

BACKGROUND ART

In order to suppress running noise of a pneumatic tire, Patent Literature 1 shown below proposes a pneumatic tire in which a noise damper made of a porous material is fixed to a tire inner cavity surface of a tread portion.

On the other hand, as a method of repairing a punctured pneumatic tire, a method of injecting puncture repair liquid for sealing the puncture hole in a tire inner cavity is known. In such a repair method, in order to spread the repair liquid into the puncture hole, it is necessary to position the puncture hole downward (on a side of the ground) prior to injection of the puncture repair liquid.

Patent Literature 1: Japanese Unexamined Patent Application Publication No. 2009-292461

DISCLOSURE OF THE INVENTION

Problem to be Solved by the Invention

When the puncture repair liquid is injected in the pneumatic tire of the above Patent Literature 1, the puncture repair liquid may be absorbed more than necessary in the noise damper near the puncture hole. In such a case, even if the pneumatic tire is rotated after injecting the puncture repair liquid, the puncture repair liquid is not uniformly distributed in a tire circumferential direction. Therefore, it is possible that uniformity of the pneumatic tire after puncture repair is deteriorated. The term "uniformity" as used herein refers to the uniformity of weight including the pneumatic tire, the noise damper, and the puncture repair liquid. If such uniformity is impaired, it is possible that running noise tends to become large.

Further, in order to efficiently seal the puncture hole formed in the inner cavity surface of the tread portion, the pneumatic tire of the above Patent Literature 1 is provided with a repair liquid permeable layer between the noise damper and the inner cavity surface of the tread portion. The repair liquid permeable layer increases an absorption rate of the puncture repair liquid by decreasing flow resistance and increasing porosity. However, such a repair liquid permeable layer further absorbs the puncture repair liquid near the puncture hole, therefore, it is possible that the distribution of the puncture repair liquid becomes more ununiform.

The present invention was made in view of the above, and a primary object thereof is to provide a pneumatic tire capable of preventing deterioration of the uniformity after puncture repair while suppressing the running noise.

Means for Solving the Problem

The present invention is a pneumatic tire comprising a noise damper fixed to a tire inner cavity surface of a tread portion and formed of a porous material, wherein the noise damper includes a first part arranged on an outer side in a tire radial direction and fixed to the tire inner cavity surface, and a second part arranged on an inner side in the tire radial direction of the first part and exposed in a tire inner cavity, a water absorption rate of the first part is in a range of from 5% to 25%, the water absorption rate being calculated by a following formula (1): water absorption rate (%)=weight change before and after immersion (g)/volume at 50% compression (cm3)×100 (1), and air permeability of the second part measured in accordance with Japanese Industrial Standard JIS-L1096 is in a range of from 1 to 7 cm3/cm2/s.

In the pneumatic tire according to the present invention, it is preferred that density of the first part is in a range of from 15 to 30 kg/m3, and density of the second part is in a range of from 20 to 35 kg/m3.

In the pneumatic tire according to the present invention, it is preferred that total volume V1 of the noise damper is in a range of from 0.4% to 30% of total volume V2 of the tire inner cavity.

In the pneumatic tire according to the present invention, it is preferred that the pneumatic tire further comprises a carcass extending between a pair of bead portions, a belt layer arranged on an outer side in the tire radial direction of the carcass and inside the tread portion, and a damping rubber body arranged inside the tread portion and on an inner or outer side in the tire radial direction of the belt layer, wherein a width W1 in a tire axial direction of the damping rubber body is in a range of from 60% to 130% of a width W2 in the tire axial direction of the belt layer.

In the pneumatic tire according to the present invention, it is preferred that a ratio (H1/H2) of hardness H1 of the damping rubber body and hardness H2 of a tread rubber arranged in the tread portion is in a range of from 0.5 to 1.0.

In the pneumatic tire according to the present invention, it is preferred that the pneumatic tire further comprises a tread rubber arranged in the tread portion, wherein a loss tangent tan δ at zero degrees Celsius of the tread rubber is not less than 0.40 and the loss tangent tan δ at 70 degrees Celsius of the tread rubber is not more than 0.20.

In the pneumatic tire according to the present invention, it is preferred that the pneumatic tire further comprises a tread rubber arranged in the tread portion, wherein the tread rubber contains carbon black, silica, and sulfur, and a content A1 (phr) of the carbon black, a content A2 (phr) of the silica, and a content A3 (phr) of the sulfur satisfy relation of a following formula (2):

$$(1.4 \times A1 + A2)/A3 \geq 20 \qquad (2).$$

Advantageous Effects of the Invention

The pneumatic tire according to the present invention comprises the noise damper fixed to the tire inner cavity surface of the tread portion and formed of the porous material. The noise damper configured as such can suppress cavity resonance, therefore, it is possible that the running noise of the pneumatic tire is decreased.

The noise damper includes the first part arranged on the outer side in the tire radial direction and fixed to the tire inner cavity surface, and the second part arranged on the inner side in the tire radial direction of the first part and exposed in the tire inner cavity.

The water absorption rate of the first part calculated by the above formula (1) is set to be in a range of from 5% to 25%. The water absorption rate of the first part configured as such is small as compared with the water absorption rate of the repair liquid permeable layer of the above Patent Literature 1. Thereby, it is possible that the first part prevents the puncture repair liquid from being absorbed more than necessary. Therefore, in the pneumatic tire according to the present invention, it is possible that the puncture repair liquid is uniformly distributed in the tire circumferential direction by the rotation of the tire after the injection of the puncture repair liquid. Thereby, the pneumatic tire according to the present invention can prevent deterioration of the uniformity after puncture repair (that is, the uniformity of the weight including the pneumatic tire, the noise damper, and the puncture repair liquid), thereby, it is possible that the running noise is effectively suppressed.

Further, the water absorption rate of the first part is set to the above-mentioned lower limit value. Therefore, it is possible that the first part absorbs the puncture repair liquid necessary for filling a puncture hole formed on the outer side in the tire radial direction of the noise damper, thereby, the puncture repair is not obstructed.

Furthermore, the air permeability of the second part measured in accordance with Japanese Industrial Standard JIS-L1096 is in a range of from 1 to 7 cm3/cm2/s. Therefore, the second part can minimize the absorption of the puncture repair liquid while decreasing the running noise of the pneumatic tire. Thereby, the pneumatic tire according to the present invention can prevent the deterioration of the uniformity after puncture repair while suppressing the running noise.

Figure 1:
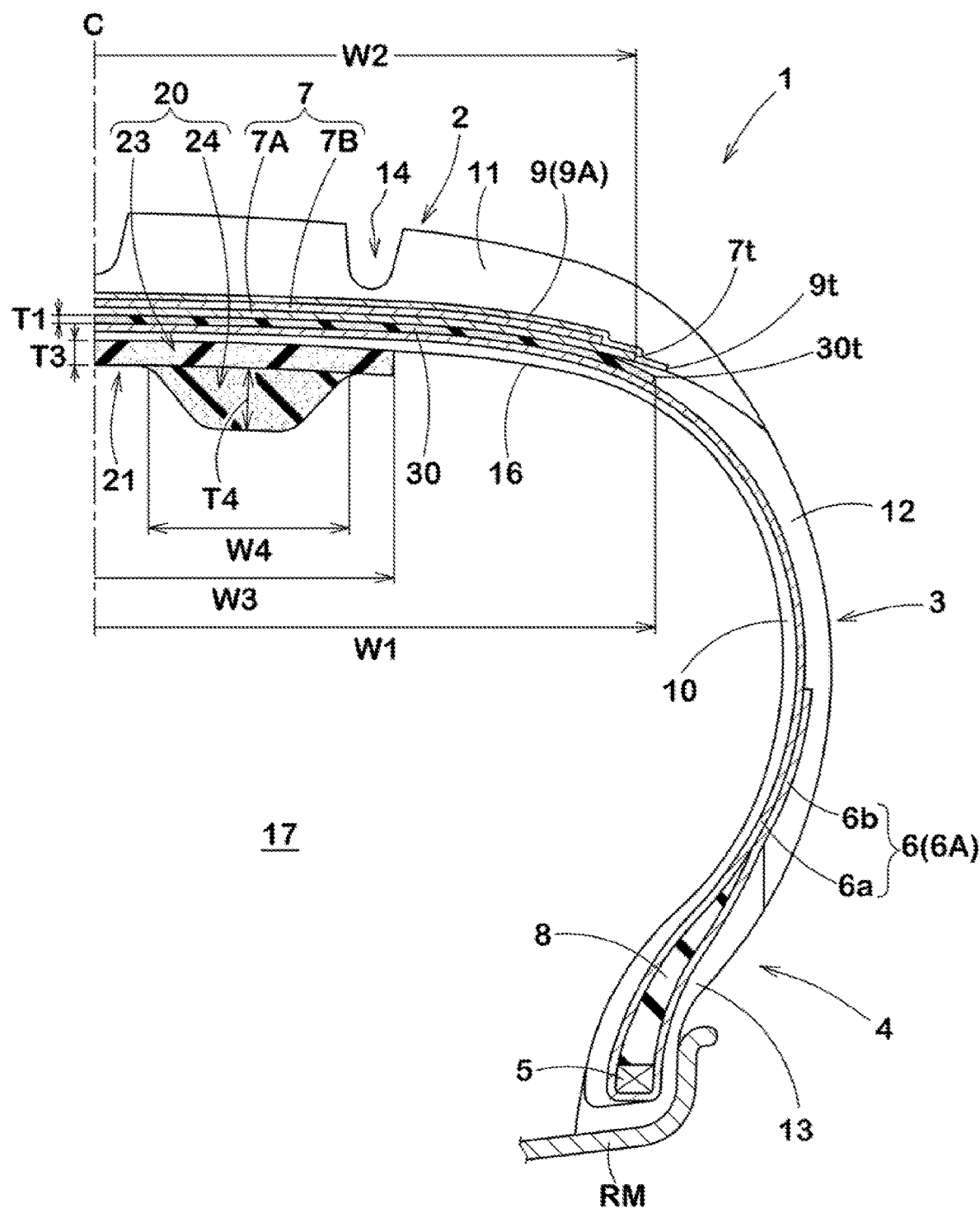
FIG. 1 a cross-sectional view of a pneumatic tire as an embodiment of the present invention.

DESCRIPTION OF THE REFERENCE SIGNS 1 pneumatic tire
16 tire inner cavity surface
17 tire inner cavity
20 noise damper
23 first part
24 second part

BEST MODE FOR CARRYING OUT THE INVENTION

An embodiment of the present invention will now be described in conjunction with accompanying drawings.

FIG. 1 is a tire meridian section passing through a tire rotational axis of a pneumatic tire (hereinafter may be simply referred to as "tire") 1 in this embodiment in a standard state. Here, the standard state is a state in which the tire is mounted on a standard rim RM, inflated to a standard inner pressure, and loaded with no tire load. Hereinafter, dimensions and the like of various parts of the tire 1 are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. When the tire is for a passenger car, it is set to 200 kPa uniformly in consideration of the actual use frequency and the like.

As shown in FIG. 1, the tire 1 is suitably used as a radial tire for passenger cars, for example. The tire 1 in this embodiment has a carcass 6, a belt layer 7, a band layer 9, an inner liner 10, and a noise damper 20. Further, the tire 1 in this embodiment has a damping rubber body 30.

The carcass 6 extends between a pair of bead portions 4, 4. The carcass 6 is formed of at least one, one in this embodiment, carcass ply 6A. The carcass ply 6A includes a main body portion 6a extending between bead cores 5 of the bead portions 4 via a tread portion 2 and sidewall portions 3 and turned up portions 6b each being turned up around respective one of the bead cores 5 from inside to outside in a tire axial direction. Between the main body portion 6a and each of the turned up portions 6b of the carcass ply 6A, a bead apex rubber 8 extending outwardly in a tire radial direction from respective one of the bead cores 5.

Carcass cords (not shown) are arranged at an angle in a range of from 80 to 90 degrees with respect to a tire equator C in the carcass ply 6A, for example. As the carcass cords, organic fiber cords such as aromatic polyamide and rayon can be used, for example.

A tread rubber 11 disposed in the tread portion 2, sidewall rubbers 12 each forming an outer surface of respective one of the sidewall portions 3, bead rubbers 13 each forming an outer surface of respective one of the bead portions 4, and the like are arranged outside the carcass 6. The tread rubber 11 is provided with grooves 14 each recessed inwardly in the tire radial direction from a ground contacting surface thereof.

The belt layer 7 is arranged on an outer side in the tire radial direction of the carcass 6 and inside the tread portion 2. The belt layer 7 is formed of two belt plies, i.e. radially inner and outer belt plies 7A and 7B. The belt plies 7A and 7B are provided with belt cords (not shown) arranged at an angle in a range of from 10 to 35 degrees with respect to a tire circumferential direction, for example. The belt plies 7A and 7B are overlapped so that the belt cords of the belt ply 7A and the belt cords of the belt ply 7B cross each other. As the belt cords, steel, aramid, rayon or the like can be used, for example.

The band layer 9 is arranged on an outer side the tire radial direction of the belt layer 7. The band layer 9 in this embodiment includes a band ply 9A in which band cords are wound in a spiral manner at an angle not more than 10 degrees, preferably not more than 5 degrees with respect to the tire circumferential direction. As the band cords, an organic fiber cord such as a nylon cord can be used, for example.

The inner liner 10 is arranged on an inner side in the tire radial direction of the carcass 6. The inner liner 10 forms a tire inner cavity surface 16. The inner liner 10 is made of air-impermeable butyl-type rubber, for example.

The noise damper 20 is formed of a porous material having a large number of pores on a surface thereof. The noise damper 20 is fixed to the tire inner cavity surface 16 of the tread portion 2. The noise damper 20 in this embodiment has an elongated belt-like shape having a bottom surface fixed to the tire inner cavity surface 16 and extends in the tire circumferential direction. Outer end portions in the circumferential direction of the noise damper 20 are in contact with each other to form a substantially annular shape. Note that the outer end portions of the noise damper 20 may be spaced apart in the tire circumferential direction.

As the porous material, a porous sponge material is exemplified, for example. The sponge material is a cavernous porous structure body. The sponge material includes not only a so-called sponge itself having interconnected cells formed by foamed rubber or a synthetic resin but also a web body formed of an animal fiber, a vegetable fiber, or a synthetic fiber and the like integrally interwoven, for example. The "porous structure body" includes not only a body having the interconnected cells but also a body having closed cells.

The noise damper 20 in this embodiment has substantially the same cross-sectional shape at an arbitrary position in the tire circumferential direction except for the outer end portions. In order to prevent collapse and deformation during running, the cross-sectional shape is formed as a flat and horizontally elongated shape in which a height is smaller than a width in the tire axial direction.

In the noise damper 20 configured as such, the pores on the surface of or inside the noise damper convert vibration energy of the vibrating air into thermal energy, therefore, it is possible that the vibration energy is consumed. Thereby, sound (cavity resonance energy) is decreased, therefore, it is possible that the running noise (around 250 Hz, for example) is decreased. The sponge material is easy to deform such as contraction, flexion, etc. Thereby, the noise damper 20 can deform flexibly following the deformation of the inner liner 10 during running.

In order to effectively suppress the cavity resonance in a tire inner cavity 17, it is preferred that total volume V1 of the noise damper 20 is in a range of from 0.4% to 30% of total volume V2 of the tire inner cavity 17. The total volume V1 of the noise damper 20 is apparent total volume of the noise damper 20, which means the volume determined from the outer shape including the inner cells. The total volume V2 of the tire inner cavity is approximately obtained by the following formula (2) in the standard state:

$$V2 = A \times \{(Di-Dr)/2 + Dr\} \times \pi \quad (2)$$

wherein
A: a cross-sectional area of the tire inner cavity obtained by CT scanning the tire-rim assembly
Di: a maximum outer diameter of the tire inner cavity surface
Dr: rim diameter
π: circumference ratio When the total volume V1 of the noise damper 20 is less than 0.4% of the total volume V2 of the tire inner cavity 17, it is possible that the noise damper 20 cannot sufficiently convert the vibration energy of the air into thermal energy. On the other hand, if the total volume V1 is more than 30% of the total volume V2, it is possible that mass and production cost of the tire 1 are increased.

It is preferred that tensile strength of the noise damper 20 is in a range of from 70 to 115 kPa. If the tensile strength of the noise damper 20 is less than 70 kPa, it is possible that durability of the noise damper 20 is deteriorated. Conversely, if the tensile strength of the noise damper 20 is more than 115 kPa, when a foreign object such as a nail sticks into the region including the noise damper 20 of the tread portion 2, for example, the noise damper 20 may be pulled by the foreign object, therefore, it is possible that the noise damper 20 comes off the tire inner cavity surface 16 of the tread portion 2.

The noise damper 20 is configured to include a first part 23 arranged on an outer side in the tire radial direction and a second part 24 arranged on an inner side in the tire radial direction of the first part. In this embodiment, the first part 23 and the second part 24 are exposed in the tire inner cavity 17. In this embodiment, the porous material forming the first part 23 is different from the porous material forming the second part 24. The first part 23 and the second part 24 are fixed by an adhesive or thermal welding or the like, for example.

The first part 23 in this embodiment has a laterally elongated rectangular cross-sectional shape. An outer peripheral surface in the tire radial direction of the first part 23 is fixed to the tire inner cavity surface 16. A thickness T3 of the first part 23 is set to be in about a range of from 10% to 30% of a maximum thickness T2 (not shown) of the tread portion 2, for example.

A width in the tire axial direction of the second part 24 in this embodiment decreases from the first part 23 toward an inner side in the tire radial direction so as to have a trapezoidal cross section. An outer peripheral surface in the tire radial direction of the second part 24 is fixed to an inner peripheral surface in the tire radial direction of the first part 23.

At least one second part 24, two second parts 24 in this embodiment, are provided. These second parts 24, 24 are provided spaced apart from each other on both sides in the tire axial direction with the tire equator C therebetween. Thereby, a concave groove 21 extending continuously in the circumferential direction is provided on a side of the inner surface in the tire radial direction of the noise damper 20. The noise damper 20 having the concave groove 21 configured as such can increase a contact area of the tire inner cavity 17 with the air, therefore, it is possible that the cavity resonance in the tire inner cavity 17 is effectively suppress. A thickness T4 of each of the second parts 24 is set to be in about a range of from 40% to 70% of the maximum thickness T2 (not shown) of the tread portion 2, for example. A width w4 of each of the second parts 24 is set to be in about a range of from 20% to 45% of a width w3 of the first part 23, for example.

Density of each of the second parts 24 in this embodiment is set to be larger than density of the first part 23. Thereby, it is possible that the cavity resonance is effectively suppressed in the tire inner cavity 17 at the second parts 24, which are in contact with the air in the tire inner cavity 17 more than the first part 23.

In order to effectively exert such an effect, it is preferred that the density of each of the second parts 24 is set to be in a range of from 1.1 to 2.3 times the density of the first part 23. Note that if the density of each of the second parts 24 is less than 1.1 times the density of the first part 23, it is possible that the cavity resonance in the tire inner cavity 17 is not sufficiently suppressed. Conversely, if the density of each of the second parts 24 is more than 2.3 times the density of the first part 23, a difference in the density between the first part 23 and each of the second parts 24 is increased, therefore, it is likely that a part around the boundary between the first part 23 and each of the second parts 24 is damaged. From this point of view, the density of each of the second part 24 is preferably not less than 1.3 times and preferably not more than 2.0 times the density of the first part 23.

The density of the second part 24 can be appropriately set as long as the above relation is satisfied. Note that if the density of each of the second parts 24 is small, it is possible that the cavity resonance in the tire inner cavity 17 is not sufficiently suppressed. Conversely, even if the density of each of the second parts 24 is large, it is possible that the mass of tire 1 is increased. From this point of view, the density of each of the second parts 24 is preferably not less than 20 kg/m3, more preferably not less than 23 kg/m3, and preferably not more than 35 kg/m3, more preferably not more than 32 kg/m3.

Further, the density of the first part 23 can be appropriately set as long as the above relation is satisfied. Note that if the density of the first part 23 is small, it is possible that the cavity resonance in the tire inner cavity 17 is not sufficiently suppressed. Conversely, even if the density of the first part 23 is large, it is possible that the mass of the tire 1 is increased. From this point of view, the density of the first part 23 is preferably not less than 15 kg/m3, more preferably not less than 18 kg/m3, and preferably not more than 30 kg/m3, more preferably not more than 27 kg/m3.

Figure 2:
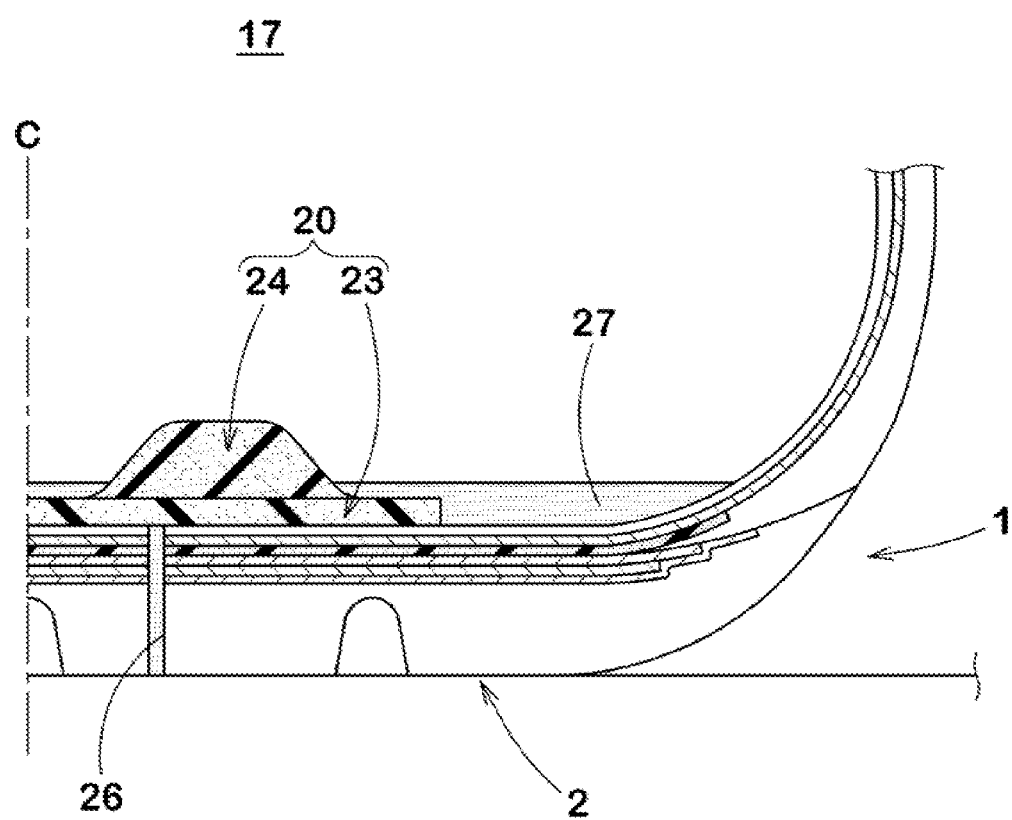
FIG. 2 a cross-sectional view illustrating a state in which the tire having a puncture hole is repaired.

FIG. 2 is a cross-sectional view illustrating a state in which the tire 1 having a puncture hole 26 is repaired. For the puncture repair of the tire 1 having the noise damper 20, puncture repair liquid 27 for sealing the puncture hole 26 is used, for example. In FIG. 2, the puncture hole 26 is formed on the outer side in the tire radial direction of the noise damper 20. When the puncture repair liquid 27 is injected in the tire inner cavity, the puncture repair liquid 27 is absorbed by the first part 23 and gets into the puncture hole 26. Thereby, it is possible that the puncture repair liquid 27 seals the puncture hole 26.

Note that if a water absorption rate of the first part 23 is large, the puncture repair liquid 27 is absorbed more than necessary by the first part 23. Thereby, even if the tire 1 is rotated after the injection of the puncture repair liquid, the puncture repair liquid 27 is not uniformly distributed in the tire circumferential direction. Therefore, it is possible that the uniformity of the tire 1 is likely to be deteriorated. The term uniformity as used herein refers to the uniformity of the weight including the pneumatic tire 1, the noise damper 20, and the puncture repair liquid 27. If such uniformity is impaired, it is possible that the running noise tends to be large.

In this embodiment, the water absorption rate of the first part 23 calculated by a formula (1) shown below is limited to be in a range of from 5% to 25%. Note that in the following formula (1), "weight change before and after immersion" is a weight increase of a test piece having a length of 50 mm, a width of 50 mm, and a thickness of 20 mm when it is compressed in the thickness direction at a compression ratio of 50%, and then immersed in water at a temperature of 20 degrees Celsius and at water depth of 10 cm for 24 hours.

$$\text{Water absorption rate (\%)} = \text{weight change before and after immersion (g)/Volume at 50\% compression (cm3)} \times 100 \quad (1)$$

The water absorption rate of the first part 23 is smaller than the water absorption rate of the repair liquid permeable layer of the above-mentioned Patent Literature 1 (about 30%, for example). The water absorption rate can be set by adjusting a water repellent agent or a hydrophilic agent added to the porous material, for example.

Owing to the water absorption rate, it is possible that the first part 23 prevents the puncture repair liquid 27 from being absorbed more than necessary. Therefore, in the tire 1 in this embodiment, it is possible that the puncture repair liquid 27 is uniformly distributed in the tire circumferential direction by the rotation of the tire after the injection of the puncture repair liquid as compared with a tire (not shown) with the first portion having a large water absorption rate, for example. Therefore, the tire 1 in this invention can prevent deterioration of the uniformity after puncture repair (that is, the uniformity of the weight including the tire 1, the noise damper 20, and the puncture repair liquid 27), thereby, it is possible that the running noise is effectively suppressed.

The water absorption rate of the first part 23 is set to the above-mentioned lower limit value. Therefore, it is possible that the first part 23 absorbs the puncture repair liquid 27 necessary for filling the puncture hole 26 formed on the outer side in the tire radial direction of the noise damper 20. Thereby, the first part 23 does not obstruct the puncture repair.

Note that if the water absorption rate of the first part 23 is more than 25%, the puncture repair liquid 27 is absorbed more than necessary in the first part 23, therefore, it is possible that the uniformity of the tire 1 is deteriorated. Conversely, if the water absorption rate of the first part 23 is less than 5%, it is possible that the puncture repair liquid 27 necessary for filling the puncture hole 26 is not absorbed at an early stage. From this point of view, the absorption rate of the first part 23 is preferably not more than 20%, and preferably not less than 10%.

Of the first part 23 and the second part 24, most of the puncture repair liquid 27 is absorbed in the first part 23. Therefore, it is possible that the water absorption rate of the second part 24 is appropriately set. Note that if the water absorption rate of the second part 24 is large, it is possible that the puncture repair liquid 27 is absorbed more than necessary by the second part 24. Conversely, if the water absorption rate of the second part 24 is small, it is possible that the effect of suppressing the cavity resonance is decreased. Thereby, it is preferred that the water absorption rate of the second part 24 is set to be in a range of from 1% to 5%.

In this embodiment, air permeability of the second part 24 measured in accordance with Japanese Industrial Standard JIS-L1096 is set larger than the air permeability of the first part 23. The second part 24 configured as such can effectively decrease the cavity resonance in the tire inner cavity 17. Note that a method of adjusting the air permeability of the second part 24 is not particularly limited. The air permeability of the second part 24 can be decreased by increasing viscosity of the raw material of the second part 24 and making the cells finer, for example. On the other hand, the air permeability of the second part 24 can be increased by decreasing the viscosity of the raw material of the second part 24 and making the cells larger.

In order to effectively exert such an effect, it is preferred that the air permeability of the second part 24 is set to be in a range of from 1 to 7 cm3/cm2/s. Note that if the air permeability of the second part 24 is less than 1 cm3/cm2/s, it is possible that the cavity resonance in the tire inner cavity 17 is not sufficiently suppressed. Conversely, if the air permeability of the second part 24 is more than 7 cm3/cm2/s, it is possible that the second part 24 absorbs the puncture repair liquid 27 more than necessary. From this point of view, the air permeability of the second part 24 is preferably not less than 2 cm3/cm2/s, and preferably not more than 6 cm3/cm2/s.

As described above, in the tire 1 in this embodiment, by limiting the water absorption rate of the first part 23 and the air permeability of the second part 24 to the above ranges, it is possible that deterioration of the uniformity after puncture repair is effectively prevented while the running noise being suppressed.

As shown in FIG. 1, the damping rubber body 30 in this embodiment is disposed inside the tread portion 2. The damping rubber body 30 is arranged on an inner side in the tire radial direction or on an outer side in the tire radial direction of the belt layer 7 (in this embodiment, on the inner side in the tire radial direction of the belt layer 7). The damping rubber body 30 in this embodiment is disposed between the carcass 6 and the belt layer 7. The damping rubber body 30 is made of rubber different from topping rubber (not shown) included in the carcass ply 6A and the belt ply 7A.

In this embodiment, hardness H1 of the damping rubber body 30 is set smaller than hardness H2 of the tread rubber 11 arranged in the tread portion 2. Here, "rubber hardness" is defined as rubber hardness measured in accordance with Japanese Industrial Standard JIS-K 6253 by a type-A durometer under an environment of 23 degrees Celsius.

The damping rubber body 30 configured as such can effectively suppress vibration of the tread portion 2, therefore, it is possible that the running noise (around 160 Hz, for example) is effectively decreased. Besides, the noise damper 20 described above can also decrease the running noise around 250 Hz, therefore, it is possible that noise performance of the tire 1 is effectively improved. Further, the damping rubber body 30 in this embodiment is disposed between the carcass 6 and the belt layer 7, therefore, vibration of the carcass 6 and the belt layer 7 is suppressed, thereby, it is possible that road noise is decreased.

In order to effectively exert such an effect, it is preferred that a ratio (H1/H2) of the hardness H1 of the damping rubber body 30 and the hardness H2 of the tread rubber 11 is set to be in a range of from 0.5 to 1.0, that is not less than 0.5 and less than 1.0. Note that if the ratio (H1/H2) is not less than 1.0, it is possible that the vibration of the tread portion 2 cannot be sufficiently suppressed. Conversely, if the ratio (H1/H2) is less than 0.5, rigidity of the damping rubber body 30 becomes small, therefore, it is possible that steering stability is not maintained. From this point of view, the ratio (H1/H2) is preferably not more than 0.8, and preferably not less than 0.6.

The hardness H1 of the damping rubber body 30 and the hardness H2 of the tread rubber 11 can be appropriately set as long as the ratio (H1/H2) satisfies the above conditions. It is preferred that the hardness H1 in this embodiment is set to be in a range of from 30 to 73 degrees. On the other hand, it is preferred that the hardness H2 in this embodiment is set to be in a range of from 55 to 75 degrees. Thereby, the tire 1 can effectively suppress the vibration of the tread portion 2 while maintaining the steering stability.

Note that rubber specialized for adhesion performance of the carcass cords (not shown) and the belt cords (not shown) (that is, rubber with low hardness) is used for the topping rubber (not shown) included in the carcass ply 6A and the belt ply 7A. Therefore, it is preferred that the hardness H1 of the damping rubber body 30 is larger than hardness H3 of the topping rubber. Note that a ratio (H1/H3) of the hardness H1 of the damping rubber body 30 and the hardness H3 of the topping rubber can be set to be in a range of from 0.4 to 1.2.

A width W1 in the tire axial direction of the damping rubber body 30 can be appropriately set. The width W1 of the damping rubber body 30 in this embodiment is set to be in a range of from 60% to 130% of a width W2 in the tire axial direction of the belt layer 7. The damping rubber body 30 configured as such can effectively suppress the vibration of the tread portion 2 while preventing an increase in the mass of the tire 1.

Note that if the width W1 of the damping rubber body 30 is less than 60% of the width W2 of the belt layer 7, it is possible that the vibration of the tread portion 2 cannot be sufficiently suppressed. Conversely, if the width W1 of the damping rubber body 30 is more than 130% of the width W2 of the belt layer 7, it is possible that the increase of the mass of the tire 1 cannot be prevented. From this point of view, it is preferred that the width W1 of the damping rubber body 30 is not less than 70% and not more than 120% of the width W2 of the belt layer 7.

Positions of each of outer ends 30t in the tire axial direction of the damping rubber body 30 are appropriately set. Each of the outer end 30t in this embodiment terminates axially outside with respect to respective one of outer ends 7t in the tire axial direction of the belt layer 7. Further, each of the outer ends 30t terminates axially inside with respect to respective one of outer ends 9t in the tire axial direction of the band layer 9. Thereby, the damping rubber body 30 can cover the entire area in the tire axial direction of the belt layer 7 on the radially inner side, therefore, it is possible that the running noise (around 160 Hz, for example) is effectively decreased.

A maximum thickness T1 of the damping rubber body 30 can be appropriately set. Note that if the maximum thickness T1 is small, it is possible that the vibration of the tread portion 2 cannot be sufficiently suppressed. Conversely, if the maximum thickness T1 is large, the movement of the tread portion 2 becomes large, therefore, it is possible that the steering stability is deteriorated. From such a point of view, it is preferred that the maximum thickness T1 is not less than 4% and not more than 20% of the maximum thickness T2 (not shown) of the tread portion 2.

It is preferred that a loss tangent tan δ at 0 degrees Celsius of the tread rubber 11 is not less than 0.40. Thereby, wet grip performance of the tire 1 is improved. Such an increase in the wet grip performance can be devoted to the decrease of volume of the grooves 14 of the tread portion 2, for example, therefore, it is possible that the running noise is further decreased.

Further, it is preferred that the loss tangent tan δ at 70 degrees Celsius of the tread rubber 11 is not more than 0.20. Thereby, rolling resistance of the tire 1 can be decreased and deterioration of fuel efficiency can be suppressed by providing the noise damper 20 and the damping rubber body 30.

The loss tangent tan δ at 0 degrees Celsius and the loss tangent tan δ at 70 degrees Celsius are measured in accordance with Japanese Industrial Standard JIS-K6394. The loss tangent tan δ at 0 degrees Celsius and the loss tangent tan δ at 70 degrees Celsius in this embodiment are measured by using a viscoelasticity spectrometer available from Iwamoto Quartz GlassLab Co., Ltd. under a condition of respective temperature (0 degrees Celsius or 70 degrees Celsius), a frequency of 10 Hz, an initial tensile strain of 10%, and an amplitude of dynamic strain of ±2%.

The tread rubber 11 in this embodiment contains carbon black, silica, and sulfur. A content A1 (phr) of the carbon black, a content A2 (phr) of the silica, and a content A3 (phr) of the sulfur can be set as appropriate but it is preferred that they satisfy the relationship of the following formula (2):

$$(1.4 \times A1 + A2)/A3 \geq 20 \tag{2}.$$

By satisfying the above formula (2), the ratio of the carbon black content A1 and the silica content A2 in the tread rubber 11 can be increased, therefore, anti-wear performance is improved. It is possible that the running noise is further decrease by devoting this increase in the anti-wear performance to decrease in the volume of the grooves 14 of the tread portion 2, for example. Furthermore, when the puncture repair is performed by using the puncture repair liquid, occurrence of uneven wear of the tread rubber 11 is suppressed even when the puncture repair liquid is unevenly distributed.

Figure 3:
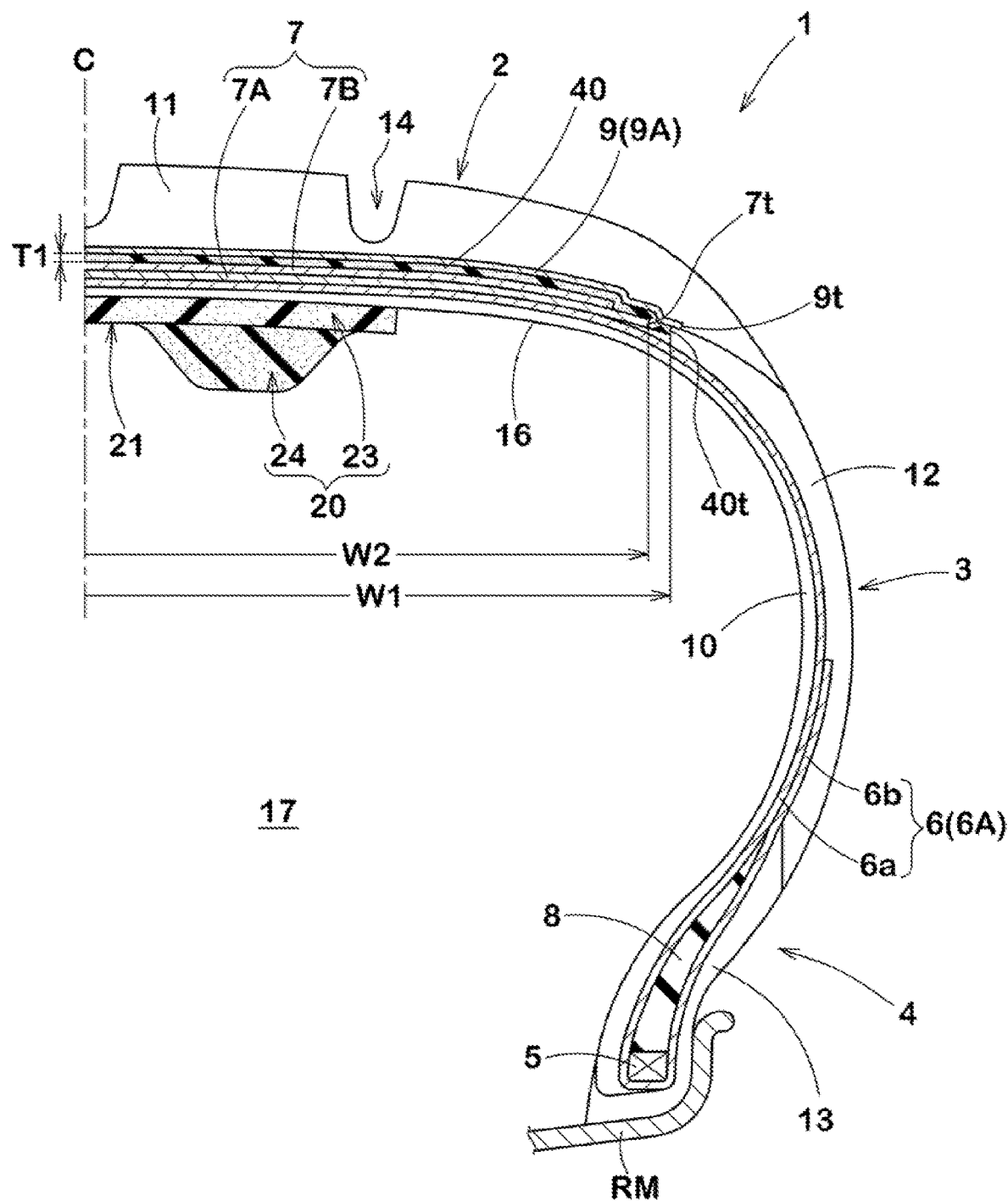
FIG. 3 a cross-sectional view of a pneumatic tire as another embodiment of the present invention.

Although the damping rubber body 30 in this embodiment is arranged on the inner side in the tire radial direction of the belt layer 7, it is not limited to such an embodiment. The damping rubber body 30 may be arranged on the outer side in the tire radial direction of the belt layer 7. FIG. 3 is a tire meridian section passing through the tire rotational axis of the tire 1, in the standard state, according to another embodiment of the present invention. Note that, in this embodiment, the same components as those of the previous embodiment are denoted by the same reference numerals, and the description thereof may be omitted.

A damping rubber body 40 in this embodiment is disposed between the belt layer 7 and the band layer 9. The damping rubber body 40 configured as such can effectively suppress the vibration of the tread portion 2, therefore, it is possible that the running noise (around 160 Hz for example) is effectively decreased. Moreover, the damping rubber body 40 in this embodiment is disposed between the belt layer 7 and the band layer 9, therefore, the vibration of the belt layer 7 and the band layer 9 is suppressed, thereby, it is possible that the road noise is decreased.

Outer ends 40t in the tire axial direction of the damping rubber body 40 in this embodiment can be appropriately set. Each of the outer ends 40t in this embodiment terminates axially outside with respect to respective one of the outer ends 7t of the belt layer 7. Further, each of the outer ends 40t terminates axially inside with respect to respective one of the outer ends 9t of the band layer 9. Thereby, the damping rubber body 40 can cover the entire area in the tire axial direction of the belt layer 7 on the radially outer side, therefore, it is possible that the running noise (around 160 Hz, for example) is effectively decreased.

Figure 4:
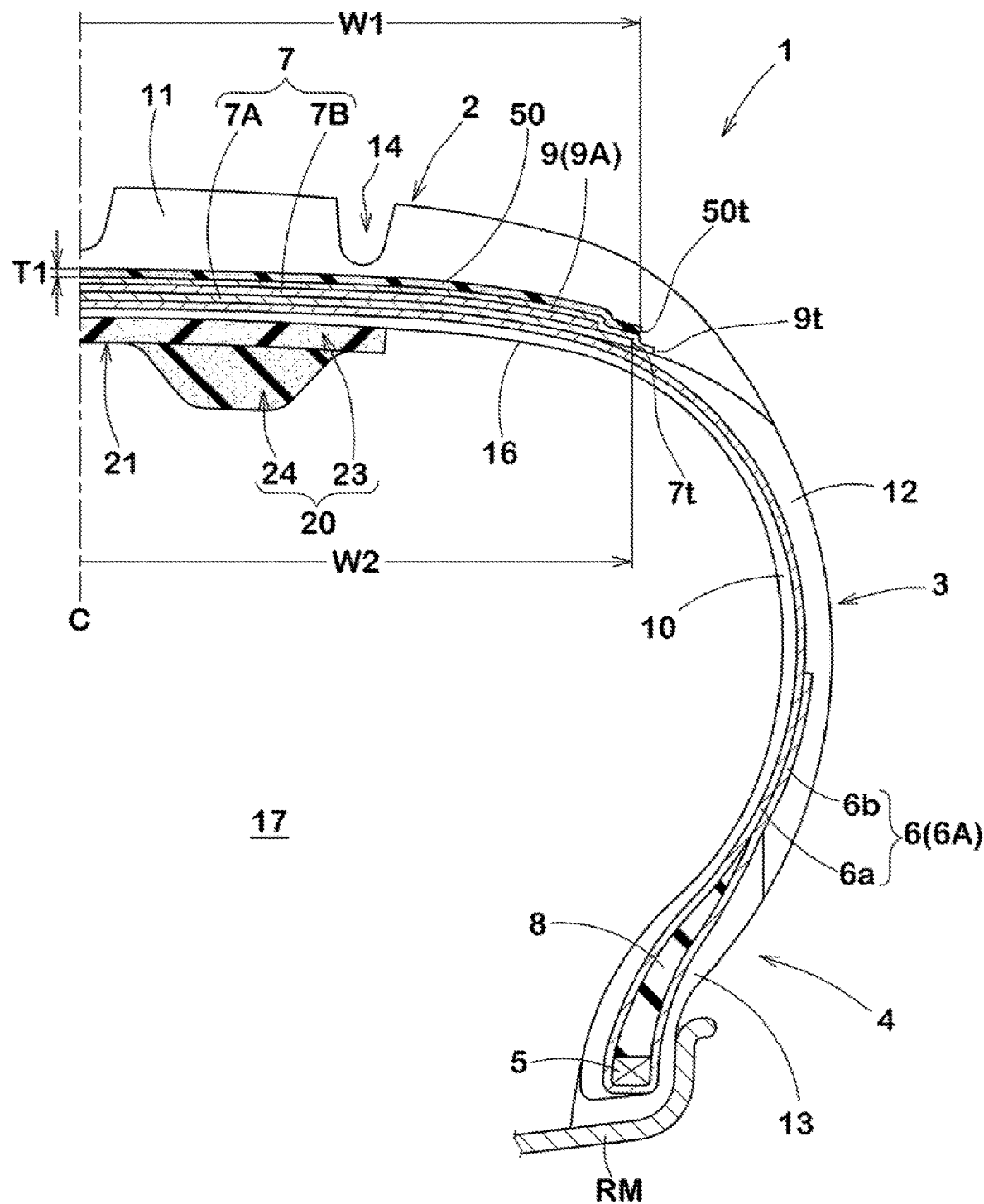
FIG. 4 a cross-sectional view of a pneumatic tire as yet another embodiment of the present invention.

FIG. 4 is a tire meridian section passing through the tire rotational axis of the tire 1, in the standard state, according to yet another embodiment of the present invention. Note that, in this embodiment, the same components as those of the previous embodiments are denoted by the same reference numerals, and the description thereof may be omitted.

A damping rubber body 50 in this embodiment is arranged on the outer side in the tire radial direction of the band layer 9. The damping rubber body 50 configured as such can effectively suppress the vibration of the tread portion 2, therefore, it is possible that the running noise (around 160 Hz for example) is effectively decreased. Moreover, the damping rubber body 50 in this embodiment is arranged on the outer side in the tire radial direction of the band layer 9, therefore, the vibration of the band layer 9 is suppressed, thereby, it is possible that the road noise is decreased.

Outer ends 50t in the tire axial direction of the damping rubber body 50 in this embodiment can be appropriately set. Each of the outer ends 50t in this embodiment terminates axially outside with respect to respective one of the outer ends 7t of the belt layer 7. Further, each of the outer ends 50t terminates axially inside with respect to respective one of the outer ends 9t of the band layer 9. Thereby, the damping rubber body 50 can cover the entire area in the tire axial direction of the belt layer 7 on the radially outer side, therefore, it is possible that the running noise (around 160 Hz, for example) is effectively decreased.

While detailed description has been made of the especially preferred embodiments of the present invention, the present invention can be embodied in various forms without being limited to the illustrated embodiments. For example, the embodiments in which the porous material constituting the first part 23 is different from the porous material of the second part 24 have been described above as examples, but the second part 24 may be formed of the same porous material as the first part 23. In this case, the first part 23 and the second part 24 may be integrally formed.

WORKING EXAMPLES

Working Examples A

Tires having the basic structure shown in FIG. 1 and the noise damper of Table 1 were manufactured, and then their performance was evaluated (Examples 1 to 26). For comparison, a tire having no noise damper and damping rubber body (Reference 1), tires in which the water absorption rate of the first portion is out of the range of from 5% to 25% (References 2 and 3) were manufactured, and then their performance was evaluated. Further, tires in which the air permeability of the second part is out of the range of from 1 to 7 cm3/cm2/s (References 4 and 5) were manufactured, and then their performance was evaluated. The specifications common to each of the Examples and the References are as follows.

Tire size: 165/65R18
Rim size: 18×7JJ
Inner pressure: 320 kPa
Test car: domestically produced FR car with displacement of 2500 cc
composition of Tread rubber:
Natural rubber (TsR20): 15 phr
SBR1 (terminal modified): 45 phr (amount of bound styrene: 28%, vinyl group content: 60%,
  glass transition point: −25 degrees Celsius)
SBR2 (terminal modified): 25 phr (amount of bound styrene: 35%, vinyl group content: 45%,
  glass transition point: −25 degrees Celsius)
BR (BR150B): 15 phr
Silane coupling agent (Si266): 4 phr
Resin (SYLVARES SA85 available from Arizona Chemical co.): 8 phr
oil: 4 phr
Wax: 1.5 phr
Age resistor (6C): 3 phr
stearic acid: 3 phr
zinc oxide: 2 phr
vulcanization accelerator (Ns): 2 phr
vulcanization accelerator (DPG): 2 phr
Carbon black (N220): 5 phr
silica (vN3, 1115 mP): 70 phr
sulfur: 2 phr
Hardness H2 of tread rubber of vulcanized tire: 64 degrees
Maximum thickness T2: 10 mm
Loss tangent tan δ at 0 degrees Celsius: 0.50
Loss tangent tan δ at 70 degrees Celsius: 0.10
(1.4× carbon black content A+silica content B)/sulfur content C: 15.0
Axial width W2 of belt layer: 120 mm
Hardness H3 of topping rubber of carcass ply and belt ply: 60 degrees
Composition of damping rubber body:
Natural rubber (TsR20): 65 phr
SBR (Nipol 1502): 35 phr
Carbon black N220: 52 phr
Oil: 15 phr
Stearic acid: 1.5 phr
Zinc oxide: 2 phr
Sulfur: 3 phr
vulcanization accelerator (CZ): 1 phr Hardness H1 of tread rubber of vulcanized tire: 58 degrees Maximum thickness T1 of damping rubber body: 1 mm Ratio (H1/H2) of Hardness H1 of damping rubber body and Hardness H2 of tread rubber: 0.7

Ratio (W1/W2) of width W1 of damping rubber body and width W2 of belt layer: 100%

Test methods are as follows.

<Noise Performance>

Each of the test tires was mounted on the above rim and was mounted on all wheels of the above test car under the above condition of the inner pressure. Then a total sound pressure (decibel) of the running noise (in a range of from 100 to 200 Hz and in a range of from 200 to 300 Hz) was measured by using a sound concentrating microphone attached to the center part of the backrest of the driver's seat while the test car was driven on a road for measuring road noise (rough asphalt surface road) at a speed of 60 km/h. The results are indicated by an index based on the Example 2 being 100, wherein the larger the numerical value, the smaller the running noise is, which is better.

<Uniformity after Puncture Repair>

Before injecting the above puncture repair liquid, a dynamic imbalance amount of each of the test tires was measured by using a tire balancer. Next, 500 ml of the puncture repair liquid was injected, each of the test tires was inflated with air to 300 kPa, and after 1 minute of rotation, the dynamic imbalance amount of each of the test tires was measured. A change rate of the dynamic imbalance amount was obtained by dividing the dynamic imbalance amount after the injection of the puncture repair liquid by the dynamic imbalance amount before the injection of the puncture repair liquid. The evaluation was indicated by an index based on a reciprocal of the change rate of the dynamic imbalance amount of the Example 2 being 100, wherein a larger numerical value is better.

<Easiness of Puncture Repair>

Each of the test tires was mounted on the above rim and punctured by rolling on a nail. Then, each of the test tires was repaired with the puncture repair liquid (main ingredient: rubber latex), and the time required for the repair was measured. The results are indicated by an index based on the Example 2 being 100, wherein the larger the numerical value, the shorter the repair time, which means that the puncture repair is easier.

<Separation Resistance Performance of Noise Damper when Nail Sticks>

Each of the test tires was mounted on the above rim and mounted on all wheels of the above test car under the condition of the above inner pressure. And each of the test tires was punctured by rolling on a nail, then the damaged part was disassembled to measure the area of separation of the noise damper from the tire inner cavity surface of the tread portion due to the noise damper being pulled by the nail. The results are indicated by an index based on the Example 2 being 100, wherein the larger the numerical value, the higher the separation resistance performance is, which is better.

<Tire Mass>

The mass per tire was measured for each of the test tires. The results are indicated by an index based on the reciprocal of the mass of the tire of the Example 2 being 100, wherein the larger the numerical value, the lighter the tire is.

<Durability of Noise Damper>

Each of the test tires was mounted on the above rim and inflated to the above inner pressure. Then, by using a drum testing machine, a distance until the noise damper and its vicinity were damaged was measured under the conditions of the tire load of 4.8 kN and the speed of 80 km/h. The results are indicated by an index based on the Example 2 being 100, wherein the larger the numerical value, the higher the durability is, which is better.

The test results are shown in Table 1.

TABLE 1

|  | Ref.1 | Ref.2 | Ex.1 | Ex.2 | Ex.3 | Ref.3 | Ref.4 | Ex.4 | Ex.5 | Ref.5 | Ex.6 | Ex.7 | Ex.8 |
| --- | --- | --- | --- | --- | --- | --- | --- | --- | --- | --- | --- | --- | --- |
| Presence (P) or Absence (A) of Noise damper | A | P | P | P | P | P | P | P | P | P | P | P | P |
| Presence (P) or Absence (A) of Damping rubber body | A | P | P | P | P | P | P | P | P. | P | P | P | P |
| Water absorption rate of First part [%] | — | 3.0 | 5.0 | 15.0 | 25.0 | 30.0 | 15.0 | 15.0 | 15.0 | 15.0 | 15.0 | 15.0 | 15.0 |
| Air permeability of Second part [cm3/cm2/s] | — | 4.0 | 4.0 | 4.0 | 4.0 | 4.0 | 0.5 | 1.0 | 7.0 | 8.0 | 4.0 | 4.0 | 4.0 |
| Density of First part [kg/m3] | — | 22.0 | 22.0 | 22.0 | 22.0 | 22.0 | 22.0 | 22.0 | 22.0 | 22.0 | 22.0 | 22.0 | 22.0 |
| Density of Second part [kg/m3] | — | 27.0 | 27.0 | 27.0 | 27.0 | 27.0 | 27.0 | 27.0 | 27.0 | 27.0 | 52.8 | 50.6 | 39.6 |
| Density of Second part/Density of First part | — | 1.2 | 1.2 | 1.2 | 1.2 | 1.2 | 1.2 | 1.2 | 1.2 | 1.2 | 2.4 | 2.3 | 1.8 |
| Ratio (V1/V2) of Total volume V1 of Noise damper and Total volume V2 of Tire inner cavity [%] | — | 15.0 | 15.0 | 15.0 | 15.0 | 15.0 | 15.0 | 15.0 | 15.0 | 15.0 | 15.0 | 15.0 | 15.0 |
| Tensile strength of. Noise damper [kPa] | — | 90.0 | 90.0 | 90.0 | 90.0 | 90.0 | 90.0 | 90.0 | 90.0 | 90.0 | 90.0 | 90.0 | 90.0 |
| Noise performance [index] [larger better] | 80 | 100 | 100 | 100 | 100 | 100 | 90 | 98 | 104 | 106. | 109 | 106 | 103 |
| Uniformity after puncture repair [index] [larger better] | — | 103 | 102 | 100 | 96 | 90 | 103 | 102 | 96 | 92 | 100 | 100 | 100 |
| Easiness of puncture repair [index] [larger better] | 110 | 90 | 98 | 100 | 106 | 109 | 100 | 100 | 100 | 100 | 100 | 100 | 100 |
| Separation resistance performance of Noise damper when Nail sticks [index] [larger better] | — | 100 | 100 | 100 | 100 | 100 | 100 | 100 | 100 | 100 | 100 | 100 | 100 |
| Tire mass [index] [larger better] | 115 | 100 | 100 | 100 | 100 | 100 | 100 | 100 | 100 | 100 | 94 | 96 | 98 |
| Durability of Noise damper [index] [larger better] | 100 | 100 | 100 | 100 | 100 | 100 | 100 | 100 | 100 | 100 | 97 | 98 | 100 |

|  | Ex.9 | Ex.10 | Ex.11 | Ex.12 | Ex.:13 | Ex.14 | Ex.15 | Ex.16 | Ex.17 | Ex.18 | Ex.19 | Ex.20 | Ex.21 |
| --- | --- | --- | --- | --- | --- | --- | --- | --- | --- | --- | --- | --- | --- |
| Presence (P) or Absence (A) of Noise damper | P | P | P | P | P | P | P | P | P | P | P | P | P |
| Presence (P) or Absence (A) of Damping rubber body | P | P | P | P | P | P | P | P | P | P | P | P | P |
| Water absorption rate of First part [%] | 15.0 | 15.0 | 15.0 | 150 | 15.0 | 15.0 | 15.0 | 150 | 15.0 | 15.0 | 15.0 | 15.0 | 15.0 |
| Air permeability of Second part [cm3/cm2/s] | 4.0 | 4.0 | 4.0 | 4.0 | 4.0 | 4.0 | 4.0 | 4.0 | 4.0 | 4.0 | 4.0 | 4.0 | 4.0 |
| Density of First part [kg/m3] | 22.0 | 22.0 | 12.0 | 15.0 | 30.0 | 32.0 | 22.0 | 22.0 | 22.0 | 22.0 | 22.0 | 22.0 | 22.0 |

TABLE 1-continued

| | | | | | | | | | | | | | |
|---|---|---|---|---|---|---|---|---|---|---|---|---|---|
| Density of Second part [kg/m3] | 24.2 | 22.0 | 27.0 | 27.0 | 27.0 | 27.0 | 18.0 | 20.0 | 35.0 | 37.0 | 27.0 | 27.0 | 27.0 |
| Density of Second part/Density of First part | 1.1 | 1.0 | 2.3 | 1.8 | 0.9 | 0.8 | 0.8 | 0.9 | 1.6 | 1.7 | 1.2 | 1.2 | 1.2 |
| Ratio (V1/V2) of Total volume V1 of Noise damper and Total volume V2 of Tire inner cavity [%] | 15.0 | 15.0 | 15.0 | 15.0 | 15.0 | 15.0 | 15.0 | 15.0 | 15.0 | 150 | 0.3 | 0.4 | 30.0 |
| Tensile strength of. Noise damper [kPa] | 90.0 | 90.0 | 90.0 | 90.0 | 90.0 | 90 | 90 | 90 | 90 | 90 | 90 | 90 | 90 |
| Noise performance [index] [larger better] | 99 | 98 | 96 | 98 | 102 | 104 | 96 | 98 | 103 | 106 | 95 | 96 | 105 |
| Uniformity after puncture repair [index] [larger better] | 100 | 100 | 100 | 100 | 100 | 100 | 100 | 400 | 100 | 100 | 100 | 400 | 100 |
| Easiness of puncture repair [index] [larger better] | 100 | 100 | 100 | 100 | 100 | 100 | 100 | 100 | 100 | 100 | 100 | 100 | 100 |
| Separation resistance performance of Noise damper when Nail sticks [index] [larger better] | 100 | 100 | 100 | 100 | 100 | 100 | 100 | 100 | 100 | 100 | 100 | 100 | 100 |
| Tire mass [index] [larger better] | 101 | 102 | 104 | 102 | 98 | 96 | 104 | 102 | 98 | 96 | 110 | 105 | 95 |
| Durability of Noise damper [index] [larger better] | 101 | 104 | 100 | 100 | 100 | 100 | 100 | 100 | 100 | 100 | 100 | 100 | 100 |

| | Ex..22 | Ex.23 | Ex..24 | Ex.25 | Ex.26 |
|---|---|---|---|---|---|
| Presence (P) or Absence (A) of Noise damper | P | P | P | P | P |
| Presence (P) or Absence (A) of Damping rubber body | P | P | P | P | P |
| Water absorption rate of First part [%] | 15.0 | 15.0 | 15.0 | 45.0 | 15.0 |
| Air permeability of Second part [cm3/cm2/s] | 4.0 | 4.0 | 4.0 | 4.0 | 4.0 |
| Density of First part [kg/m3] | 22.0 | 22.0 | 22.0 | 22.0 | 22.0 |
| Density of Second part [kg/m3] | 27.0 | 27.0 | 27.0 | 27.0 | 27.0 |
| Density of Second part/Density of First part | 1.2 | 1.2 | 1.2 | 1.2 | 1.2 |
| Ratio (V1/V2) of Total volume V1 of Noise damper and Total volume V2 of Tire inner cavity [%] | 35.0 | 15.0 | 15.0 | 15.0 | 15.0 |
| Tensile strength of. Noise damper [kPa] | 90 | 60 | 70 | 115 | 125 |
| Noise performance [index] [larger better] | 110 | 100 | 100 | 100 | 100 |
| Uniformity after puncture repair [index] [larger better] | 100 | 100 | 100 | 100 | 100 |
| Easiness of puncture repair [index] [larger better] | 100 | 100 | 100 | 100 | 100 |
| Separation resistance performance of Noise damper when Nail sticks [index] [larger better] | 100 | 103 | 102 | 98 | 96 |
| Tire mass [index] [larger better] | 90 | 100 | 100 | 100 | 100 |
| Durability of Noise damper [index] [larger better] | 100 | 97 | 96 | 102 | 104 |

From the test results, the tires as the Examples could prevent the deterioration of the uniformity after the puncture repair while suppressing the running noise as compared with the tires as the References. Further, the tires as the Examples showed better easiness of puncture repair as compared with the tires as the Reference 2.

Working Examples B

Tires having the basic structure shown in FIG. 1, 2 or 3 and the noise damper and the damping rubber body of Table 2 were manufactured, and then their performance was evaluated (Examples 27 to 39). The specifications common to each of the Examples are the same as those of the working Examples A except for those listed in Table 2 and shown below.
First part of noise damper:
water absorption rate: 15.0(%)
Density: 22.0 (kg/m3)
Second part of noise damper:
Air permeability: 4.0 (cm3/cm2/s)
Density: 27.0 (kg/m3)
Tensile strength of noise damper: 90.0 (kPa)
Ratio (V1/V2) of total volume V1 of noise damper and total volume V2 of tire inner cavity: 15(%)
Hardness H1 of damping rubber body of vulcanized tire: adjusted by changing oil content The test methods are the same as in the working Examples A except for the following method.
<Steering Stability>
Each of the test tires was mounted on the above rim and mounted on all wheels of the above test car under the condition of the above inner pressure. While the test car was driven on a dry asphalt test course, characteristics related to steering response, rigid impression, grip, and the like were evaluated by the driver's feeling. The results are indicated by an evaluation point based on the Example 28 being 100, wherein a larger numerical value is better.
The test results are shown in Table 2.

TABLE 2

| | Ex.27 | Ex.28 | Ex.29 | Ex.30 | Ex.31 | Ex.32 | Ex.33 | Ex.34 | Ex.35 | Ex.36 | Ex.37 | Ex.38 | Ex.39 |
|---|---|---|---|---|---|---|---|---|---|---|---|---|---|
| Figure showing Cross section of Tire | FIG. 1 | FIG. 1 | FIG. 1 | FIG. 1 | FIG. 1 | FIG. 1 | FIG. 1 | FIG. 1 | FIG. 1 | FIG. 1 | FIG. 1 | FIG. 2 | FIG. 3 |
| Presence (P) or Absence (A) of Damping rubber body | A | P | P | P | P | P | P | P | P | P | P | P | P |
| Ratio (H1/H2) of Hardness H1 of Damping rubber body and | — | 0.4 | 0.5 | 0.7 | 1.0 | 1.2 | 0.7 | 0.7 | 0.7 | 0.7 | 0.7 | 0.7 | 0.7 |

TABLE 2-continued

|  | Ex.27 | Ex.28 | Ex.29 | Ex.30 | Ex.31 | Ex.32 | Ex.33 | Ex.34 | Ex.35 | Ex.36 | Ex.37 | Ex.38 | Ex.39 |
|---|---|---|---|---|---|---|---|---|---|---|---|---|---|
| Hardness H2 of Tread rubber | — | 100 | 100 | 100 | 100 | 100 | 50 | 60 | 70 | 130 | 140 | 100 | 100 |
| Ratio (W1/W2) of Width W1 of Damping rubber body and Width W2 of Belt layer rim |  |  |  |  |  |  |  |  |  |  |  |  |  |
| Noise performance [index] [larger is better] | 95 | 105 | 102 | 100 | 98 | 96 | 96 | 97 | 98 | 103 | 105 | 98 | 96 |
| Tire mass [index] [larger is better] | 110 | 100 | 100 | 100 | 100 | 100 | 106 | 104 | 102 | 98 | 96 | 100 | 100 |
| Steering stability [index] [larger is better] | 115 | 100 | 103 | 105 | 107 | 109 | 112 | 110 | 105 | 03 | 101 | 106 | 107 |

From the test results, the tires as the Examples could prevent the deterioration of the uniformity after puncture repair while suppressing the running noise. Further, by setting the ratio (H1/H2) of the hardness H1 of the damping rubber body and the hardness H2 of the tread rubber to the preferable range, it was possible that the steering stability was improved.

Working Examples C

Tires having the basic structure shown in FIG. 1 and the noise damper described in the working Examples B, the damping rubber body described in the working Examples A, and the tread rubber of Table 3 were manufactured, and then their performance was evaluated (Examples 40 to 46). The specifications common to each of the Examples are the same as those of the working Examples A except for those listed in Table 3 and shown below. Note that the common specifications of the noise damper are as in the working Examples B. The common specifications of the damping rubber body are as in the working Examples A.

Composition of Tread Rubber:
Same as in the working Examples A except for carbon black, silica, and sulfur shown below
  Carbon black (N220): A (arbitrary) phr
  Silica (VN3, 1115 MP): B (arbitrary) phr
  Sulfur: C (arbitrary) phr
The test methods are the same as in the working Examples A except for the following methods.
<Wet Grip Performance>
Each of the test tires was mounted on the above rim and mounted on all wheels of the above test car under the condition of the above inner pressure. While the test car was driven on a wet asphalt road, grip performance was evaluated by the driver's feeling. The evaluation was indicated by an index based on the Example 40 being 100, wherein a larger numerical value is better.
<Rolling Resistance Performance>
Each of the test tires was mounted on the above rim, and then the rolling resistance under the condition of the above inner pressure, tire load of 4.8 kN, and at a speed of 80 km/h was measured by using a rolling resistance tester. The results are indicated by an index based on the reciprocal of the value of the Example 40 being 100, wherein a larger numerical value is better.
<Anti-Wear Performance>
Each of the test tires was mounted on the above rim and mounted on all wheels of the above test car under the condition of the above inner pressure. Then the test car was driven on highways and general roads (including city roads and mountain roads) with two members on the car for a total of 340 km. Then a wear index (running distance/wear amount) was measured in three block-like portions on a tire circumference of a shoulder land region of the tread portion, and then an average value thereof was calculated. The results are indicated by an index based on the reciprocal of the wear index of the Example 40 being 100, wherein a larger numerical value is better.

The test results are shown in Table 3.

TABLE 3

|  | Ex.40 | Ex.41 | Ex.42 | Ex.43 | Ex.44 | Ex.45 | Ex.46 |
|---|---|---|---|---|---|---|---|
| Loss tangent tan δ at zero degrees celsius of Tread rubber | 0.35 | 0.40 | .50 | 0.50 | 0.50 | 0.50 | 0.50 |
| Loss tangent tan δ at 70 degrees celsius of Tread rubber | 0.25 | 0.25 | 0.25 | 0.20 | 0.10 | 0.10 | 0.10 |
| (1.4 × A1 + A2)/A3 | 15.0 | 15.0 | 15.0 | 15.0 | 15.0 | 20.0 | 37.5 |
| Noise performance [index] [larger is better] | 100 | 100 | 100 | 100 | 100 | 100 | 100 |
| Wet grip performance [index] [larger is better] | 100 | 105 | 110 | 110 | 110 | 110 | 110 |
| Rolling resistance performance [index] [larger is better] | 100 | 100 | 100 | 105 | 110 | 110 | 110 |
| Anti-wear performance [index] [larger is better] | 100 | 100 | 100 | 100 | 100 | 105 | 115 |

From the test results, the tires as the Examples could prevent the deterioration of the uniformity while suppressing the running noise. Further, by setting the loss tangents tan δ (zero degrees Celsius, 70 degrees Celsius), the carbon black content, the silica content, and the sulfur content to the preferable ranges, it was possible that the wet grip performance, the rolling resistance performance, and the anti-wear performance were improved.

The invention claimed is:
1. A pneumatic tire comprising a noise damper fixed to a tire inner cavity surface of a tread portion and formed of a porous material, wherein
  the noise damper includes a first part arranged on an outer side in a tire radial direction and fixed to the tire inner cavity surface, and a second part arranged on an inner side in the tire radial direction of the first part and exposed in a tire inner cavity, a water absorption rate of the first part is in a range of from 5% to 25%, the water absorption rate being calculated by a following formula (1):

water absorption rate (%)=weight change before and after immersion (g)/volume at 50% compression (cm3)×100    (1), and air permeability of the second part measured in accordance with Japanese Industrial Standard JIS-L1096 is in a range of from 1 to 7 cm3/cm2/s.

2. The pneumatic tire according to claim 1, wherein density of the first part is in a range of from 15 to 30 kg/m3, and density of the second part is in a range of from 20 to 35 kg/m3.

3. The pneumatic tire according to claim 1, wherein total volume V1 of the noise damper is in a range of from 0.4% to 30% of total volume V2 of the tire inner cavity.

4. The pneumatic tire according to claim 1 further comprising a carcass extending between a pair of bead portions, a belt layer arranged on an outer side in the tire radial direction of the carcass and inside the tread portion, and a damping rubber body arranged inside the tread portion and on an inner or outer side in the tire radial direction of the belt layer, wherein a width W1 in a tire axial direction of the damping rubber body is in a range of from 60% to 130% of a width W2 in the tire axial direction of the belt layer.

5. The pneumatic tire according to claim 4, wherein a ratio (H1/H2) of hardness H1 of the damping rubber body and hardness H2 of a tread rubber arranged in the tread portion is in a range of from 0.5 to 1.0.

6. The pneumatic tire according to claim 1 further comprising a tread rubber arranged in the tread portion, wherein a loss tangent tan δ at zero degrees Celsius of the tread rubber is not less than 0.40 and the loss tangent tan δ at 70 degrees Celsius of the tread rubber is not more than 0.20.

7. The pneumatic tire according to claim 1 further comprising a tread rubber arranged in the tread portion, wherein the tread rubber contains carbon black, silica, and sulfur, and a content A1 (phr) of the carbon black, a content A2 (phr) of the silica, and a content A3 (phr) of the sulfur satisfy relation of a following formula (2):

(1.4×*A*1+*A*2)/*A*3≥20    (2).

8. The pneumatic tire according to claim 2, wherein total volume V1 of the noise damper is in a range of from 0.4% to 30% of total volume V2 of the tire inner cavity.

9. The pneumatic tire according to claim 2 further comprising a carcass extending between a pair of bead portions, a belt layer arranged on an outer side in the tire radial direction of the carcass and inside the tread portion, and a damping rubber body arranged inside the tread portion and on an inner or outer side in the tire radial direction of the belt layer, wherein a width W1 in a tire axial direction of the damping rubber body is in a range of from 60% to 130% of a width W2 in the tire axial direction of the belt layer.

10. The pneumatic tire according to claim 3 further comprising a carcass extending between a pair of bead portions, a belt layer arranged on an outer side in the tire radial direction of the carcass and inside the tread portion, and a damping rubber body arranged inside the tread portion and on an inner or outer side in the tire radial direction of the belt layer, wherein a width W1 in a tire axial direction of the damping rubber body is in a range of from 60% to 130% of a width W2 in the tire axial direction of the belt layer.

11. The pneumatic tire according to claim 2 further comprising a tread rubber arranged in the tread portion, wherein a loss tangent tan δ at zero degrees Celsius of the tread rubber is not less than 0.40 and the loss tangent tan δ at 70 degrees Celsius of the tread rubber is not more than 0.20.

12. The pneumatic tire according to claim 3 further comprising a tread rubber arranged in the tread portion, wherein a loss tangent tan δ at zero degrees Celsius of the tread rubber is not less than 0.40 and the loss tangent tan δ at 70 degrees Celsius of the tread rubber is not more than 0.20.

13. The pneumatic tire according to claim 4 further comprising a tread rubber arranged in the tread portion, wherein a loss tangent tan δ at zero degrees Celsius of the tread rubber is not less than 0.40 and the loss tangent tan δ at 70 degrees Celsius of the tread rubber is not more than 0.20.

14. The pneumatic tire according to claim 5 further comprising a tread rubber arranged in the tread portion, wherein a loss tangent tan δ at zero degrees Celsius of the tread rubber is not less than 0.40 and the loss tangent tan δ at 70 degrees Celsius of the tread rubber is not more than 0.20.

15. The pneumatic tire according to claim 2 further comprising a tread rubber arranged in the tread portion, wherein the tread rubber contains carbon black, silica, and sulfur, and a content A1 (phr) of the carbon black, a content A2 (phr) of the silica, and a content A3 (phr) of the sulfur satisfy relation of a following formula (2):

(1.4×*A*1+*A*2)/*A*3≥20    (2).

16. The pneumatic tire according to claim 3 further comprising a tread rubber arranged in the tread portion, wherein the tread rubber contains carbon black, silica, and sulfur, and a content A1 (phr) of the carbon black, a content A2 (phr) of the silica, and a content A3 (phr) of the sulfur satisfy relation of a following formula (2):

(1.4×*A*1+*A*2)/*A*3≥20    (2).

17. The pneumatic tire according to claim 4 further comprising a tread rubber arranged in the tread portion, wherein the tread rubber contains carbon black, silica, and sulfur, and a content A1 (phr) of the carbon black, a content A2 (phr) of the silica, and a content A3 (phr) of the sulfur satisfy relation of a following formula (2):

(1.4×*A*1+*A*2)/*A*3≥20    (2).

18. The pneumatic tire according to claim 5 further comprising a tread rubber arranged in the tread portion, wherein the tread rubber contains carbon black, silica, and sulfur, and a content A1 (phr) of the carbon black, a content A2 (phr) of the silica, and a content A3 (phr) of the sulfur satisfy relation of a following formula (2):

$$(1.4 \times A1 + A2)/A3 \geq 20 \tag{2}.$$

19. The pneumatic tire according to claim 6 further comprising a tread rubber arranged in the tread portion, wherein the tread rubber contains carbon black, silica, and sulfur, and a content A1 (phr) of the carbon black, a content A2 (phr) of the silica, and a content A3 (phr) of the sulfur satisfy relation of a following formula (2):

$$(1.4 \times A1 + A2)/A3 \geq 20 \tag{2}.$$

* * * * *